United States Patent
Bingaman

(10) Patent No.: US 10,941,747 B1
(45) Date of Patent: Mar. 9, 2021

(54) GRAVITATIONAL VORTEX VARIABLE WATER FLOW ENERGY GENERATING SYSTEM INCLUDING ADJUSTABLE HEIGHT TURBINE AND DIFFUSER ASSEMBLIES

(71) Applicant: Ronald D. Bingaman, Zephyr Cove, NV (US)

(72) Inventor: Ronald D. Bingaman, Zephyr Cove, NV (US)

(73) Assignee: Rondid D. Bingaman, Gardnerville, NV (US)

( * ) Notice: Subject to any disclaimer, the term of this patent is extended or adjusted under 35 U.S.C. 154(b) by 0 days.

(21) Appl. No.: 16/659,208

(22) Filed: Oct. 21, 2019

(51) Int. Cl.
| | |
|---|---|
| F03B 15/00 | (2006.01) |
| F03B 11/00 | (2006.01) |
| F03B 13/10 | (2006.01) |
| F03B 3/14 | (2006.01) |
| F03B 3/12 | (2006.01) |

(52) U.S. Cl.
CPC .............. *F03B 13/10* (2013.01); *F03B 3/145* (2013.01); *F03B 11/00* (2013.01); *F03B 15/00* (2013.01); *F03B 3/121* (2013.01); *F03B 11/004* (2013.01); *F05B 2240/132* (2013.01); *Y10T 137/2087* (2015.04); *Y10T 137/2109* (2015.04)

(58) Field of Classification Search
CPC .......... F03B 13/10; F03B 3/145; F03B 3/121; F03B 11/004; F05B 2240/132; Y10T 137/2109; Y10T 137/2087
USPC .......................... 290/42, 43, 54; 60/398, 698
See application file for complete search history.

(56) References Cited

U.S. PATENT DOCUMENTS

| | | | |
|---|---|---|---|
| 3,226,084 A * | 12/1965 | Kanger ................... | F03B 3/145 415/150 |
| 3,372,905 A | 3/1968 | Brown | |
| 4,224,526 A | 9/1980 | Margison | |
| 4,236,866 A | 12/1980 | Zapata Martinez | |
| 4,441,029 A * | 4/1984 | Kao ........................ | F03B 13/08 290/52 |
| 4,443,707 A | 4/1984 | Scieri | |
| 4,754,155 A * | 6/1988 | Obermeyer ............. | F03B 15/00 290/52 |
| 5,336,933 A | 8/1994 | Ernster | |

(Continued)

FOREIGN PATENT DOCUMENTS

| | | |
|---|---|---|
| WO | WO1999017017 | 4/1999 |
| WO | W02017015520 | 1/2017 |

(Continued)

*Primary Examiner* — Tulsidas C Patel
*Assistant Examiner* — S. Mikailoff

(57) ABSTRACT

A gravitational vortex variable flow energy system (GVvFES) is disclosed. An example embodiment includes: a turbine basin having an inlet portion and an outlet portion, the turbine basin having a hybrid conical shape; a generator installed adjacent to the turbine basin; a turbine blade hub having turbine blades attached thereto, the turbine blade hub being coupled to the generator with a turbine blade axle, the turbine blade hub being configured to achieve a variable and configurable height relative to a top of the turbine basin; and a diffuser installed beneath the outlet portion of the turbine basin, the diffuser being configured to achieve a variable and configurable height relative to a bottom of the turbine basin. An example embodiment also includes linkage to vary an angle or pitch of the turbine blades.

20 Claims, 9 Drawing Sheets

(56) References Cited

U.S. PATENT DOCUMENTS

| | | | | |
|---|---|---|---|---|
| 5,921,745 | A * | 7/1999 | Round | F03B 3/00 |
| | | | | 415/122.1 |
| 6,051,892 | A | 4/2000 | Toal, Sr. | |
| 6,114,773 | A * | 9/2000 | Kouris | F03B 13/105 |
| | | | | 290/52 |
| 7,915,750 | B1 * | 3/2011 | Rovinsky | F03B 13/10 |
| | | | | 290/52 |
| 8,127,542 | B1 | 3/2012 | Dolcimascolo | |
| 8,196,396 | B1 | 6/2012 | Tseng | |
| 8,240,998 | B2 | 8/2012 | Otto | |
| 8,400,007 | B2 | 3/2013 | Campbell | |
| 8,426,990 | B2 * | 4/2013 | Oswald | F03B 3/128 |
| | | | | 290/43 |
| 8,823,195 | B2 | 9/2014 | Legacy | |
| 8,946,918 | B1 | 2/2015 | Natarius | |
| 9,322,385 | B1 | 4/2016 | Hallett | |
| 10,202,960 | B2 | 2/2019 | Williams | |
| 10,648,446 | B2 * | 5/2020 | Kouris | F03B 13/10 |
| 2009/0015018 | A1 | 1/2009 | Nail | |
| 2011/0260460 | A1 * | 10/2011 | Rovinsky | F03B 13/10 |
| | | | | 290/54 |
| 2011/0266804 | A1 | 11/2011 | Dolcimascolo | |
| 2012/0098264 | A1 | 4/2012 | Ganichot | |
| 2012/0187690 | A1 | 7/2012 | Walton | |
| 2012/0313375 | A1 * | 12/2012 | Song | F03B 3/02 |
| | | | | 290/52 |
| 2016/0084218 | A1 | 3/2016 | Obermeyer | |
| 2016/0177911 | A1 | 6/2016 | Kouris | |
| 2017/0149306 | A1 | 5/2017 | Gordon | |
| 2018/0023540 | A1 * | 1/2018 | Lai | F03B 17/063 |
| | | | | 290/54 |
| 2018/0195489 | A1 | 7/2018 | Martin | |
| 2018/0372059 | A1 * | 12/2018 | Slachmuylders | F03B 13/10 |
| 2020/0124019 | A1 * | 4/2020 | Clifford | B01F 3/04539 |

FOREIGN PATENT DOCUMENTS

| | | |
|---|---|---|
| WO | WO2018067076 | 4/2018 |
| WO | WO2018152639 | 8/2018 |
| WO | WO2019086714 | 5/2019 |

* cited by examiner

US 10,941,747 B1

GRAVITATIONAL VORTEX VARIABLE WATER FLOW ENERGY GENERATING SYSTEM INCLUDING ADJUSTABLE HEIGHT TURBINE AND DIFFUSER ASSEMBLIES

TECHNICAL FIELD

The disclosed subject matter relates to the field of hydro-electric power generation systems, vortex power plants, and vortex turbines, and in particular, to a Gravitational Vortex Variable Flow Energy System (GVvFES).

COPYRIGHT

A portion of the disclosure of this patent document contains material that is subject to copyright protection. The copyright owner has no objection to the facsimile reproduction of the patent document or the patent disclosure, as it appears in the U.S. Patent and Trademark Office patent files or records, but otherwise reserves all copyright rights whatsoever. The following notice applies to the disclosure provided herein and to the drawings that form a part of this document: Copyright 2018-2019, Ronald D. BINGAMAN; All Rights Reserved.

BACKGROUND

Small hydropower plants on streams or smaller rivers or low head dams for the production of electrical energy are known. These include water vortex power plants or gravitational water vortex power plants. Hydro-electric generators utilize kinetic and/or potential energy from water to generate electricity. The energy may be related to the speed and volume at which the water flows and/or an amount of head available. Head corresponds to the change in water level between the hydropower plant intake and the hydropower plant discharge point. Head is a vertical height, typically measured in meters. The specific design of generators depends on a number of factors; however, the dominating considerations may be the available head and speed and volume of water flow.

Large head installations may generate large amounts of power. For example, hydroelectric stations along a major river may generate a number of gigawatts of power. Such large generating capacity requires both a large amount of water and a large head. However, there are a limited number of sites at which such large scale hydro-electric generation are possible. Further, such large scale generation may require large infrastructure, such as dams further limiting the ability to install new generation capabilities.

There are a large number of sites at which smaller-scale hydro-electric generation may be possible. For example, there are a large number of rivers, smaller reservoirs or other flows that may have a low available head, such as a few feet or a few meters, but which may be suitable for small scale electricity generation. It is desirable to have an efficient generator suitable for use in low-head installations and where the available water source may have variable flow rates.

SUMMARY

There is disclosed herein various example embodiments of a Gravitational Vortex Variable Flow Energy System (GVvFES). In general, a vortex basin type turbine captures kinetic energy directly from the dynamic action of the vortex created by moving water. This is unique when compared to the vast array of commercial turbines used that fall generally within one of two major categories: either impulse style turbines or reaction style turbines. In impulse style turbines, the water flows through a nozzle and strikes moving blades to turn a generator. In reaction style turbines, the water glides over the moving blades, which possess both pressure and kinetic energy. In impulse style turbines, the pressure of the water flow remains constant during its flow through the moving blades.

Vortex turbine rotation speed is significantly slower (e.g., in the area of 30-50 rpms) compared to most turbines in which rotations speeds are in the general area of 200 to 1200 rpms. In addition to the comparatively slower turbine blade rotation speed, the vortex turbine basin system is very fish friendly in that the turbine blade speed is operating at about half the water velocity speed and is operating in the same direction as the water flow, not in the more perpendicular manner to the water flow direction as in reaction style turbines. Most sizes of fish as well as different species of fish can pass safely through a vortex turbine basin when the fish are migrating downstream while the vortex turbine energy generation system is operating under full power output. Most young adult and fully mature anadromous fish are successful in migrating upstream through the vortex turbine system as disclosed herein. This along with the natural aeration of the water are two significant environmental benefits unique to the vortex turbine design as described herein.

In the various example embodiments described herein, the basic design of the disclosed vortex turbine system is comprised of three major components: the inlet portion, the turbine basin, and the outlet portion. The inlet portion of the system is usually either fed by a closed water transport such as a pipe or other style of penstock or an open flume with an overall slightly downhill slope angle that transports the water from the source, usually a stream/river or a low head reservoir to the turbine basin. From the inlet portion, water flows into the turbine basin tangentially, which helps to create a strong vortex. It should be noted that the directional water flow within the turbine basin is clockwise north of the equator and counterclockwise south of the equator. As such, care must be taken to ensure that the set-up of the generator is appropriate to the given vortex rotational direction. The water flow enters the turbine basin from the inlet portion at the outside and top of the turbine basin then gradually flows down in a spiral flow toward the center of the turbine basin where the outlet portion opening is located. As the water rotates toward the center and the bottom of the basin, the water gains significant speed that contains the greatest amount of energy. The lower center of the vortex is where the turbine blades operate to extract as much kinetic energy as possible from the flow of water. After the water flows to the center and lower portion of the turbine basin where the energy is extracted via the turbine blades, the water flows through the outlet portion into a flume or channel back into a downstream area of the river or outlet waterway from the reservoir.

In general, a small commercial vortex turbine system (up to a quarter megawatt output) would operate with a head in the range of 1 to 3 meters with flows rates up to 12-14 m3/s. Even larger commercial vortex turbine systems with a plated output of a megawatt or more can be designed provided, assuming the head/turbine basin diameter ratios are respected. Vortexes created without the proper turbine basin ratios and flow characteristics can be much weaker or even not form at all.

The design specifications for the siting of any given vortex turbine system can be based on the water source's Flow Duration Curve (FDC) that provides detailed insight into the aggregated water flow rate and volumes of the source based on averaged flow data collected over several years or even decades. Regardless of which type of turbine/generator system to be selected for any given proposed site, the FDC is crucial to proper selection of system equipment, calculation of expected power output, and projected efficiencies, etc. The various example embodiments are described in more detail below.

BRIEF DESCRIPTION OF THE DRAWINGS

Embodiments are illustrated by way of example and not limitation in the figures of the accompanying drawings, in which.

DETAILED DESCRIPTION

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

Figure 1:
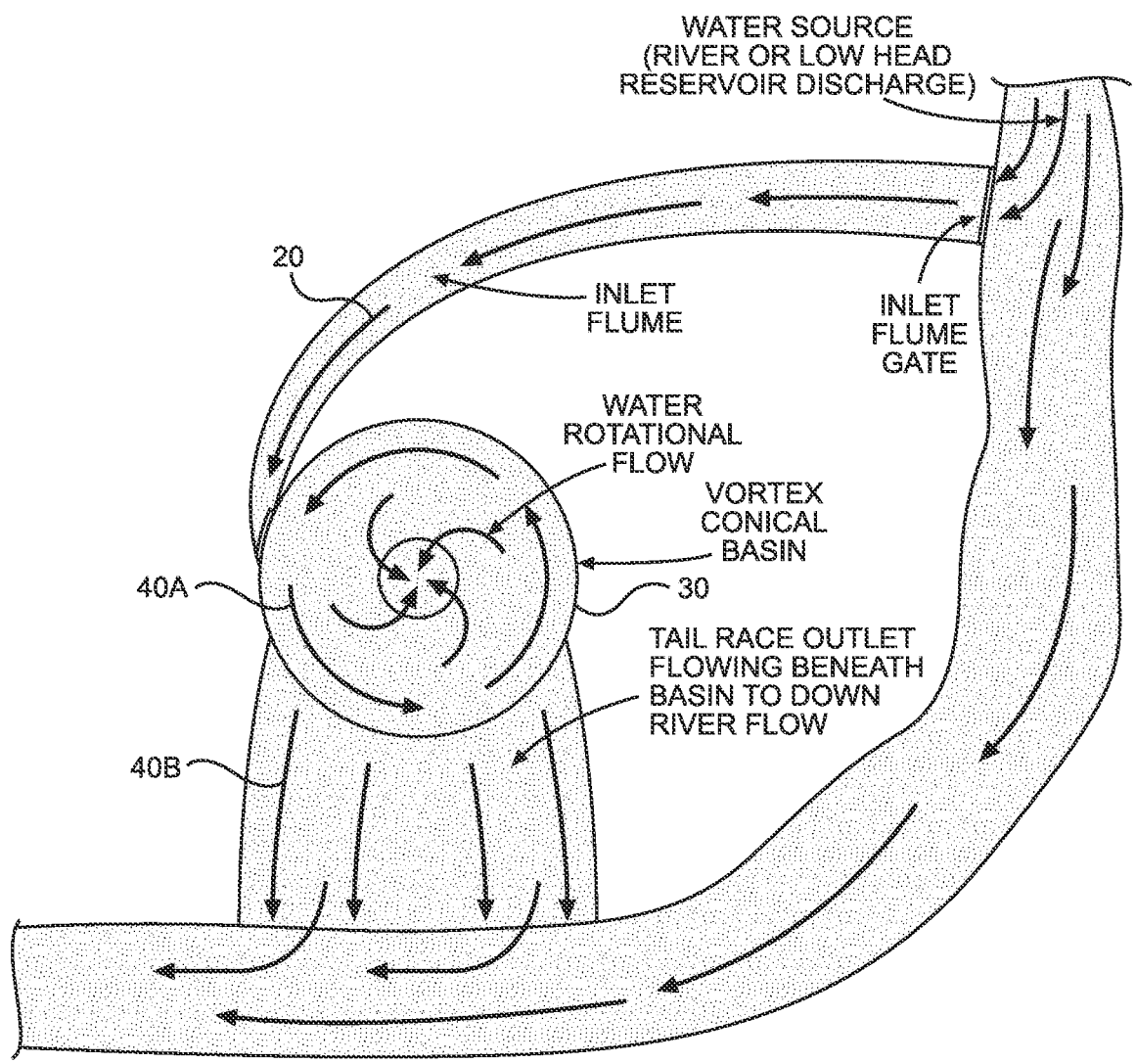
FIG. 1 illustrates an example embodiment of the major components (e.g., the inlet portion, the turbine basin, and the outlet portion) of a Gravitational Vortex Variable Flow Energy System (GVvFES) in a top view.
Figure 2:
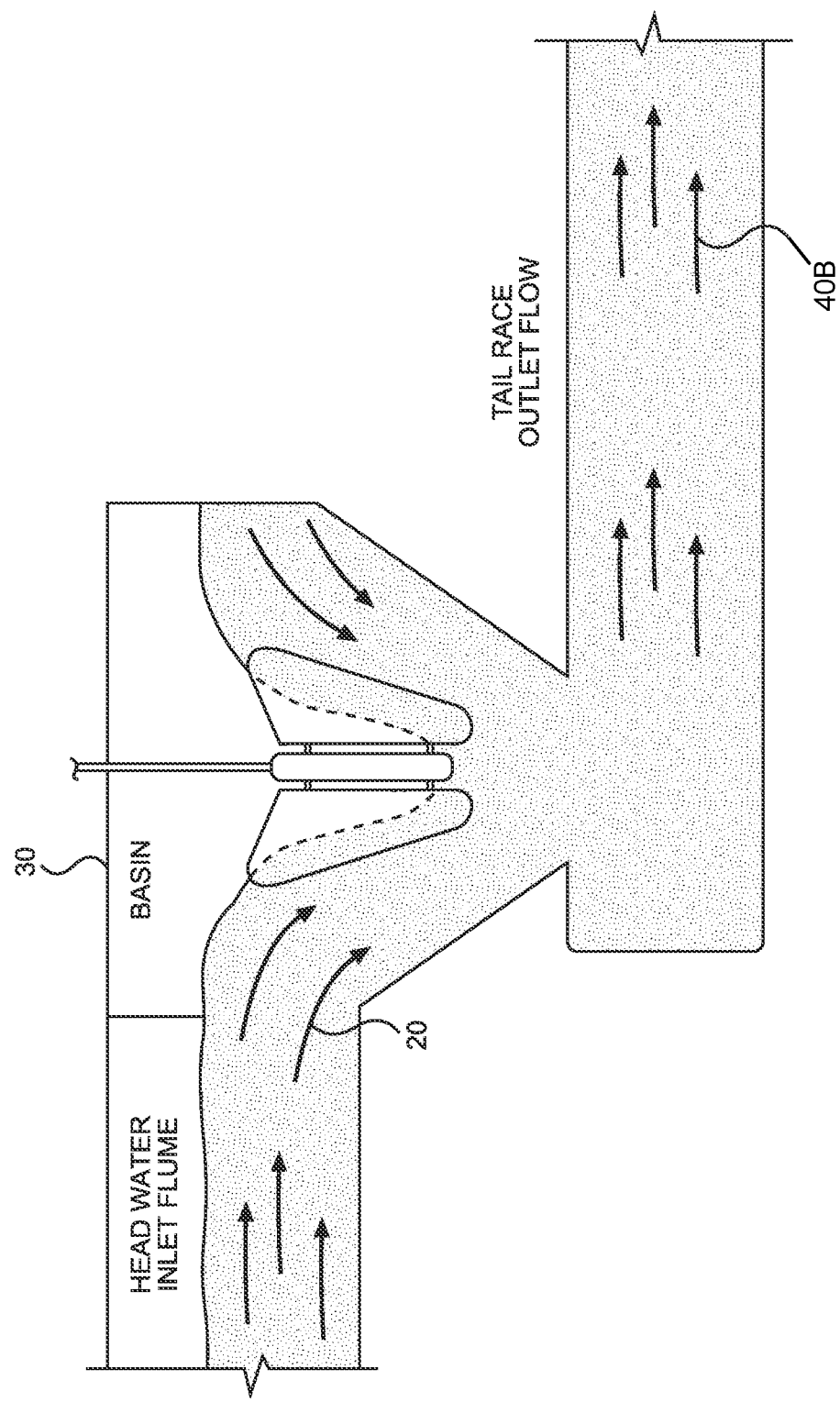
FIG. 2 illustrates an example embodiment of the major components (e.g., the inlet portion, the turbine basin, and the outlet portion) of the GVvFES in a side view.

In various example embodiments disclosed and illustrated herein, a Gravitational Vortex Variable Flow Energy System (GVvFES) 100 is described. In example embodiments, the basic design of the described vortex turbine system 100 comprises three major components: the inlet portion that directs the inlet flow 20, the turbine basin 30, and the outlet portion that directs the outlet flows 40A and 40B as shown in FIGS. 1 and 2. The reference identifier 40A corresponds to a portion for the rotational outlet water flow. The reference identifier 40B corresponds to a portion for the linear outlet water flow. Referring to FIGS. 1 and 2, FIG. 1 illustrates a top view of an example embodiment of the major components (e.g., the inlet portion that directs the inlet flow 20, the turbine basin 30, and the outlet portion that directs the outlet flows 40A/40B) of a Vortex Variable Flow Energy System (GVvFES) 100. FIG. 2 illustrates a side view of an example embodiment of the major components (e.g., inlet portion that directs the inlet flow 20, turbine basin 30, and outlet portion that directs the outlet flow 40B) of the GVvFES 100. As shown, the inlet portion that directs the inlet flow 20 of the system is usually either fed by a closed water transport, such as a pipe or other style of penstock, or an open flume with an overall slightly downhill slope angle that transports the water from the source, usually a stream/river or a low head reservoir to the turbine basin 30. From the inlet portion that directs the inlet flow 20, water flows into the turbine basin 30 tangentially, which helps to create a strong vortex. The water flow enters the turbine basin 30 from the inlet portion that directs the inlet flow 20 at the outside and top of the turbine basin 30, then gradually flows down in a spiral flow toward the center of the turbine basin 30 where the outlet portion opening is located. As the water rotates toward the center and the bottom of the turbine basin 30, the water gains significant speed that contains the greatest amount of energy. As described in more detail below, the lower center of the vortex is where the turbine blades operate to extract as much kinetic energy as possible from the flow of water. After the water flows to the center and lower portion of the turbine basin 30 where the energy is extracted via the turbine blades, the water flows through the outlet portion that directs the outlet flow 40B into a flume or channel back into a downstream area of the river or outlet waterway from a reservoir.

Figure 3:
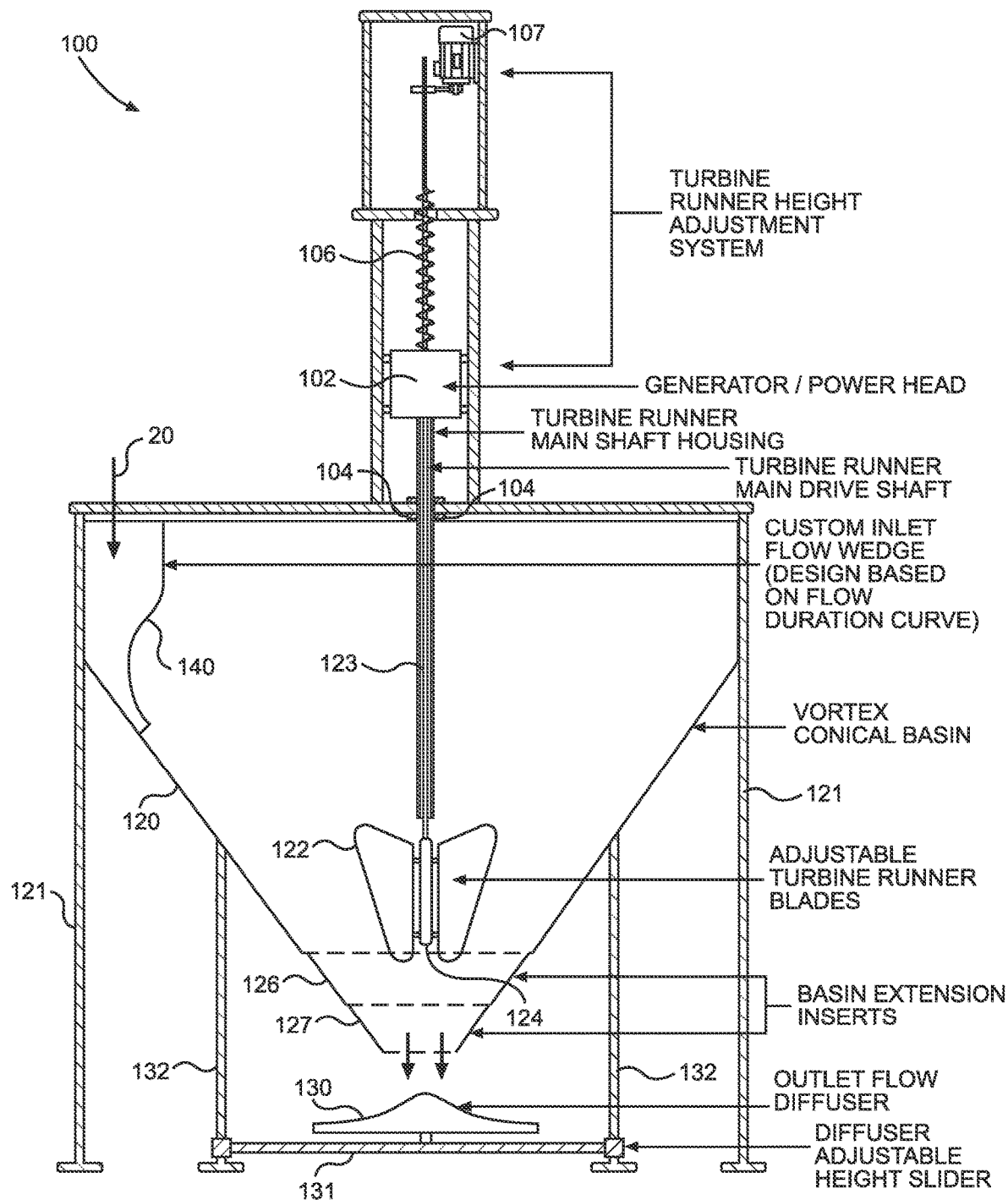
FIG. 3 illustrates an example embodiment of the GVvFES in a cross section view.

FIG. 3 illustrates an example embodiment of the Vortex Variable Flow Energy System (GVvFES) 100 in a cross section view. As shown, the GVvFES 100 of an example embodiment includes a turbine basin 120 supported by a basin framework including vertical posts 132, an electrical energy generator 102, a turbine blade hub 124 having turbine blades 122 attached thereto, and a turbine blade axle 123 connecting the turbine blade hub 124 to the generator 102. In the illustrated example embodiment, the turbine basin 120 is a modified conical shape with an upper portion angled into a cylindrical shape. A water flow inlet portion that directs the inlet flow 20 is provided at the top and side of the turbine basin 120 as shown in FIG. 3. In operation, water flows into the inlet portion that directs the inlet flow 20 creating a vortex within the basin 120. The water vortex makes contact with the turbine blades 122 causing the turbine blade axle 123 to rotate, which causes the generator 102 to generate electrical energy.

Although the basic operation of a vortex turbine system is straightforward, there are many variables that can affect the efficiency of the vortex turbine system. For example, the quantity or volume of water flowing into the inlet portion 20 and the speed of the water flow entering the inlet portion 20 can greatly affect the efficiency or even the ability of the vortex turbine system to generate electrical energy. A high volume and high speed of water flowing into inlet portion 20 can inundate the turbine basin 120 and fail to efficiently turn the turbine blades 122. Conversely, a low volume and low speed of water flowing into inlet portion 20 can fail to cause the formation of a vortex, which again can fail to efficiently turn the turbine blades 122. Conventional vortex turbine systems attempt to create a configuration that works reasonably well most of the time without providing an ability to reconfigure the vortex turbine system in real-time to accommodate changing environmental conditions, water flow conditions, and/or electrical output requirements. For example, the basic conventional vortex turbine system is typically a single configuration design to process the best average flow rates and to operate within the variations of the seasonal changes given the dynamic head available over an average year's flow. In most applications, the maximum elevation of the top of the basin is at the lowest dynamic head level as identified over the span of the previous year(s) of available flow data. The lower basin outlet level would be placed at the highest point of the dynamic flow levels again extracted from available data of the previous year(s) data. In the past, there have been no configurable design features or modifications to take full advantage of maintaining the overall average of the dynamic head year round, which increases total output and efficiencies required for commercial applications.

In response to these failures of the conventional vortex turbine systems, the GVvFES 100 of the various example embodiments provides a variety of configurable and adaptable features that enable the GVvFES 100 to be configurable and adaptable in real-time to accommodate changing environmental conditions, water flow conditions, and/or electrical output requirements. The new GVvFES 100 design as disclosed herein can maximize the electrical power output by utilizing the total available head year round regardless of the changes in the dynamic head over the course of the various seasonal flow changes. The GVvFES 100 design was developed based on extensive analysis of the conventional vortex turbine systems to identify the features requiring significant improvements, and to identify entirely new features that would be needed to significantly enhance operating efficiencies and overall electrical power output. With these new and/or improved features as disclosed herein, the described GVvFES 100 is capable of much higher overall electrical production at commercial levels. Accordingly, this new vortex system design can be utilized at potential sites that can have significant seasonal dynamic changes in head and flow volumes from stream flows or low head reservoir discharges that can vary widely over time. These configurable features of the GVvFES 100 of the various example embodiments are described in more detail below.

Referring again to FIG. 3, the GVvFES 100 of an example embodiment includes a turbine basin 120. In the illustrated example embodiment, the turbine basin 120 is a modified or hybrid conical shape with an upper portion angled into a cylindrical shape. This overall shape of the turbine basin 120 is particularly designed to maximize the efficiency of the GVvFES 100 over a variety of environmental and water flow conditions. Historically, the majority of the smaller vortex turbine power systems used in rural areas and in third world countries have utilized a cylindrical shaped basin design based on the ease of construction by local unskilled labor. This typical basin shape can use only a limited portion of the available water flow as no adjustable flow/head features are designed into the overall basin structure. Computational Fluid Dynamics (CFD) modeling demonstrates that a conical basin design is more efficient and will produce more power, in part, because of less frictional losses in the lower flow ranges from a higher floor surface to head ratio than the standard cylindrical design. In these lower flow ranges, the frictional coefficient of the ratio of head to diameter in a cylindrical basin increases significantly and thus reduces the strength of the vortex with a corresponding reduction of power output efficiencies. However, in the high flow range, it is necessary to ensure good entry water velocity to maximize the vortex strength in which a straight cylindrical design would be more efficient. Therefore, to maximize the vortex strength at all flow ranges and to keep within the most efficient range of the head to basin diameter, the GVvFES 100 of an example embodiment uses a modified or hybrid conical turbine basin 120 design to ensure the highest electrical power efficiencies possible over the dynamic flow range of the Flow Duration Curve for any given water source. CFD modeling suggests the conical angle zone is most efficient between 14 to 18 degrees for smaller commercial flow ranges, but could be increased for larger flow ranges. Ultimately, the angle of the conical portion of the turbine basin 120 design can be fine-tuned from the data analysis of the FDC for a particular site location.

It should be noted that the particular vortex turbine system layout for a specific site location is dependent on the hemisphere in which the vortex turbine system will be located. If the vortex turbine system is sited in the northern hemisphere, the design layout will be oriented such that the water entering and flowing within the turbine basin 120 flows in a clockwise rotation. If the unit is located in the southern hemisphere, the design layout will be mirrored such that the water flow entering and flowing within the turbine basin 120 flows in a counterclockwise rotation. This variation in the system layout for a specific site location will maximize the vortex strength from the contributing Coriolis effect, which tends to rotate liquids directionally based on the hemisphere in which the facility is located.

Referring still to FIG. 3, the GVvFES 100 of an example embodiment includes a custom site-specific flow inlet wedge 140 inserted or installed into the inlet portion 20 of the turbine basin 120. Entry velocity of the water flowing into the turbine basin 120 is critical to form a strong high energy vortex. To ensure the formation of the strongest vortex possible at all flow levels, the custom designed flow inlet wedge 140 can be placed at the entry point of the turbine basin 120 and just at the end of the inlet portion 20 flume. The exact shape of the flow inlet wedge 140 opening can be calculated from the aggregated flow data extracted from the Flow Duration Curve specific to the proposed site location. The flow inlet wedge 140 opening will ensure the best water entry angle and velocity when water enters the turbine basin 120 to form the highest energy vortex possible. FIGS. 3 through 6 illustrate where and how the entry water flows into the turbine basin 120 through the flow inlet wedge 140 opening. The flow inlet wedge 140 causes the water flow to be directed to the very outside perimeter of the turbine basin 120 while maintaining a 90 degree tangential entry angle. The expanded flow inlet wedge 140 opening toward the top accommodates calculated higher flow volumes to maximize entry velocity and thus, the strongest vortex possible.

Figure 4:
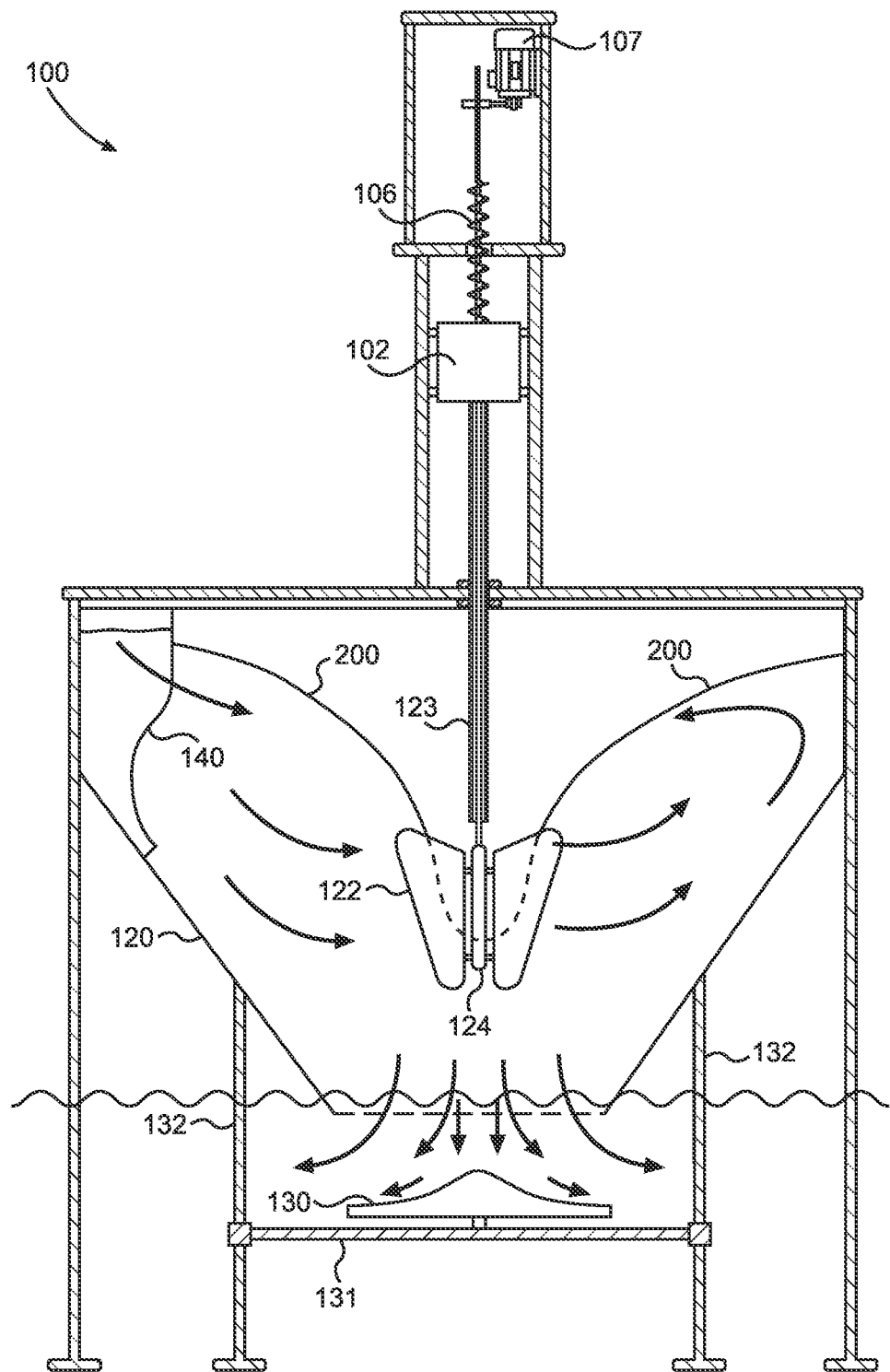
FIG. 4 illustrates an example embodiment of the GVvFES basin in a cross section view at high flow with no basin extensions and the turbine blade hub in a high position.
Figure 5:
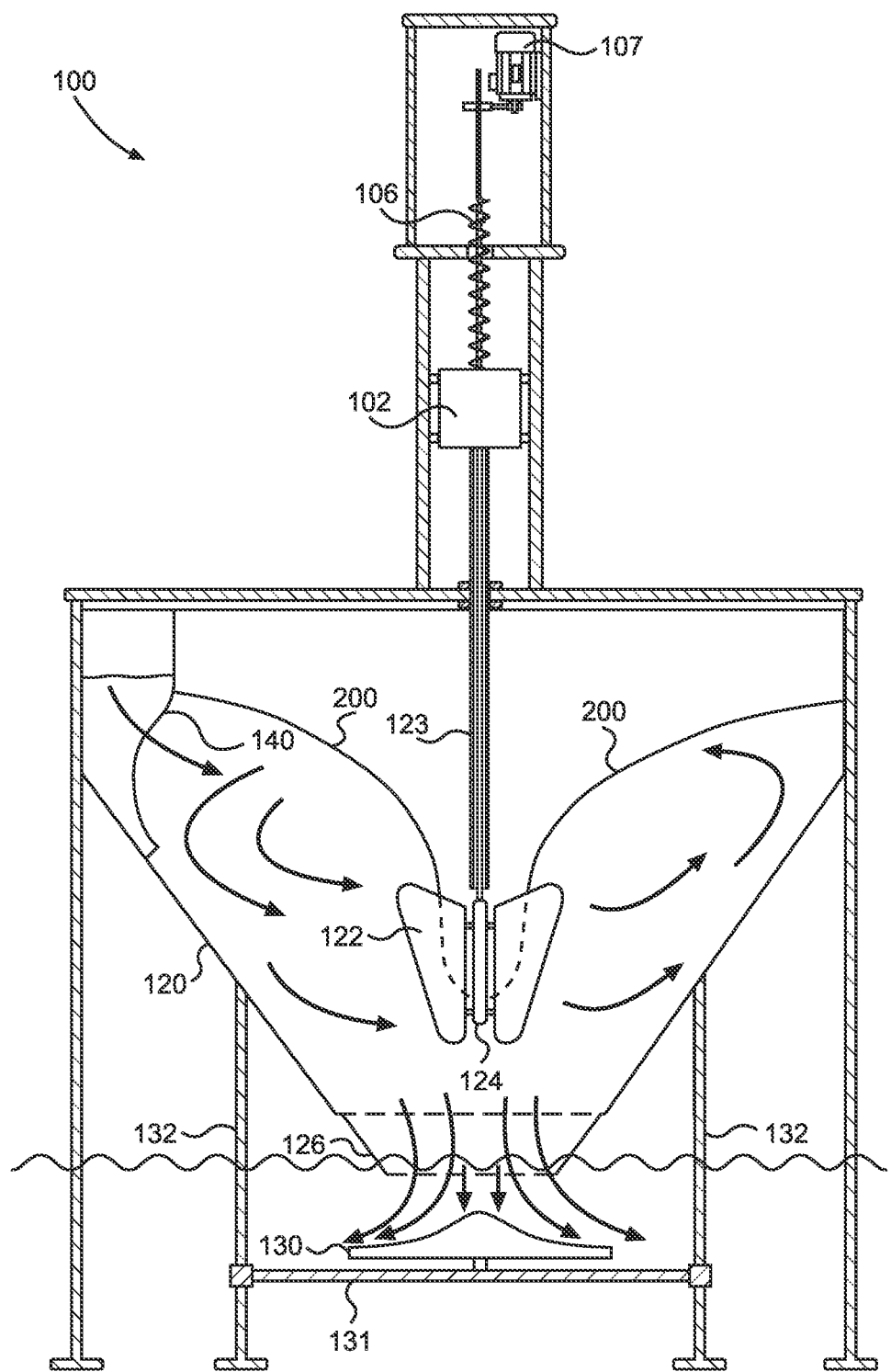
FIG. 5 illustrates an example embodiment of the GVvFES basin in a cross section view at medium flow with one basin extension added, the turbine blade hub in a lower position, and the outlet diffuser in a lower position.
Figure 6:
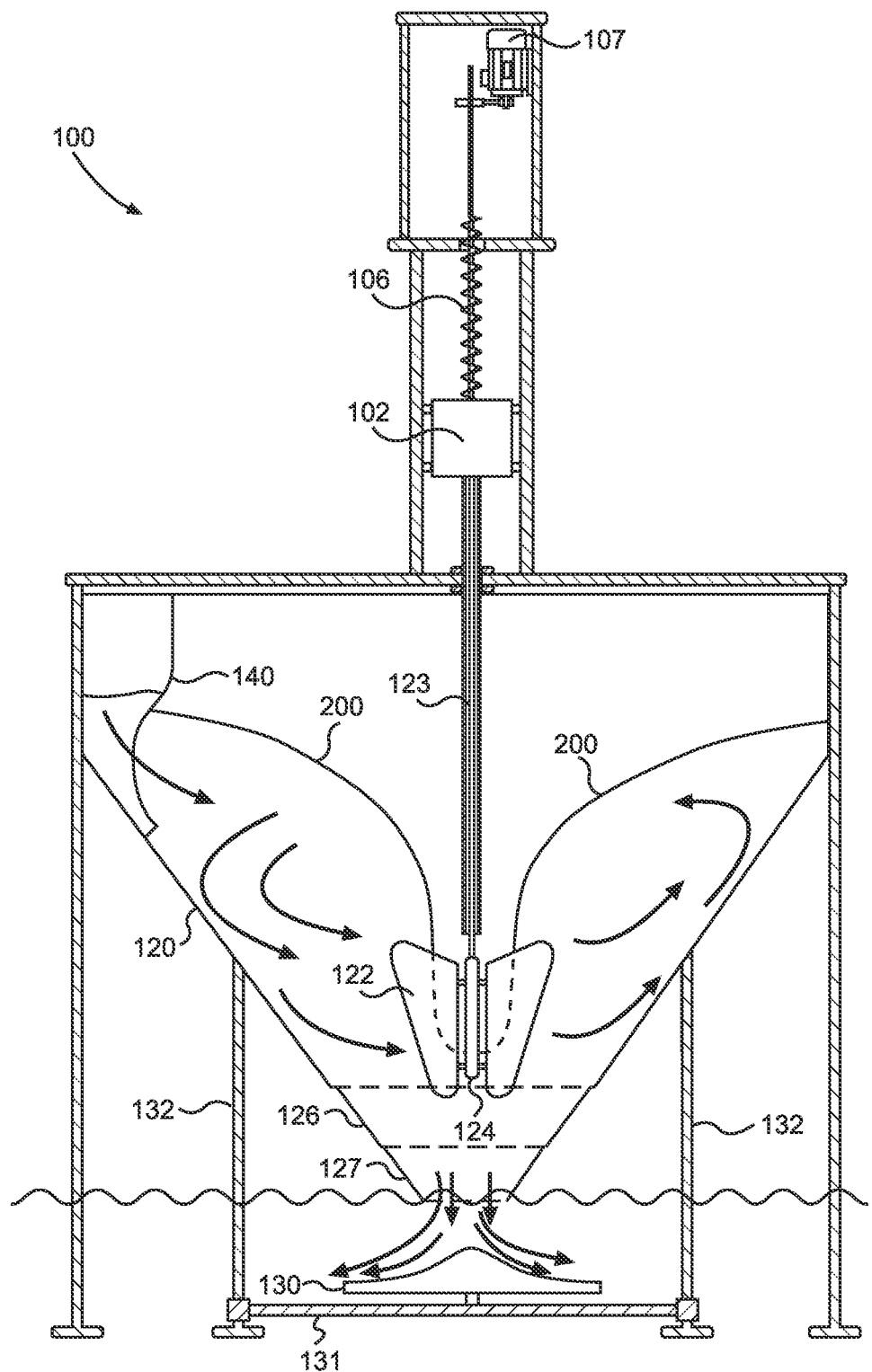
FIG. 6 illustrates an example embodiment of the GVvFES basin in a cross section view at low flow with two basin extensions added, the turbine blade hub in a lowest position, and the outlet diffuser in a lowest position.

Referring now to FIGS. 4 through 6, the GVvFES 100 of an example embodiment includes an adjustable basin height relative to the seasonal dynamic head. To ensure consistently higher commercial power production throughout all seasonal flow ranges, it is necessary for the basin structure of the vortex energy system to adjust to produce maximum power output. The basin extensions 126 and 127 (see FIGS. 3, 5, and 6) are a novel design feature that facilitates this requirement. The basin extensions 126 and 127 provide the design flexibility to maintain high efficiencies with corresponding higher power output levels within the mid to lower water flow ranges by maintaining the active dynamic head level and proportionally reducing the outlet flow in accordance with the incoming flow range. The average overall static head level is protected and remains the same over the range of high, mid, and low water flow rates. When the inlet water level lowers from high flow conditions to mid-range flow conditions due to reduced overall flow rates, a basin extension 126 can be inserted or installed at a lower portion of the turbine basin to create the reduced head at the outlet. During the annual low flow ranges and the inlet flow level is at its lowest level, an additional basin extension 127 can be inserted to again protect the overall head in the turbine basin 120. The basin extensions 126 and 127 can be fabricated from any rigid or flexible material (e.g., metal, plastic, composite material, ceramic, stone, concrete, etc. The basin extensions 126 and 127 can be fabricated in a generally conical shape that conforms to the lower dimensions of the turbine basin 120 at its outlet portion. Clearance for the water outlet flow via the basin extension is facilitated due to the corresponding lower tail race levels. FIGS. 4 through 6 illustrate how this feature of the GVvFES 100 protects the overall basin head level in all seasonal flow rates.

Referring now to FIG. 4, the diagram illustrates an example embodiment of the GVvFES basin 120 in a cross section view at a high flow with no basin extensions and the turbine blade hub 124 in a high position. Given the high flow rate and high inlet flow level of the example shown in FIG. 4, the unmodified dimensions of the outlet portion of the basin 120 can sustain a sufficient water level in the basin 120 to form a vortex. The turbine blade hub 124 with turbine blades 122 can be positioned at the low point of the vortex to increase the efficiency of the power generation produced by the GVvFES 100. The high water volume can drain through the outlet portion and be disbursed into the tail race flow via the outlet diffuser 130.

Referring now to FIG. 5, the diagram illustrates an example embodiment of the GVvFES basin 120 in a cross section view at medium flow with one basin extension 126 added, the turbine blade hub 124 in a lower position, and the outlet diffuser 130 in a lower position. The adjustable height outlet diffuser 130 of an example embodiment is described in more detail below. Because the flow rate and inlet flow level of the example shown in FIG. 5 has reduced, the unmodified dimensions of the outlet portion of the basin 120 cannot sustain a sufficient water level in the basin 120 to form a vortex or the formed vortex may not be optimal for energy extraction. In this case, a basin extension 126 can be added to the bottom of the basin 120 to extend and narrow the dimensions of the outlet portion. This extension of the basin 120 serves to sustain a sufficient water level in the basin 120 to form an efficient vortex. The turbine blade hub 124 with turbine blades 122 can be positioned (typically lowered) at the low point of the vortex to increase the efficiency of the power generation produced by the GVvFES 100. The mid-level water volume can drain through the outlet portion and be disbursed into the tail race flow via the lowered outlet diffuser 130.

Referring now to FIG. 6, the diagram illustrates an example embodiment of the GVvFES basin 120 in a cross section view at low flow with two basin extensions 126/127 added, the turbine blade hub 124 in a lowest position, and the outlet diffuser 130 in a lowest position. Because the flow rate and inlet flow level of the example shown in FIG. 6 has reduced, the modified dimensions of the outlet portion of the basin 120, even with the insertion of basin extension 126, still cannot sustain a sufficient water level in the basin 120 to form a vortex or the formed vortex may not be optimal for energy extraction. In this case, a second basin extension 127 can be added to the bottom of the basin extension 126 at the bottom of basin 120 to further extend and narrow the dimensions of the outlet portion. This additional extension of the basin 120 serves to sustain a sufficient water level in the basin 120 to form an efficient vortex. The turbine blade hub 124 with turbine blades 122 can be positioned (typically lowered) at the low point of the vortex to increase the efficiency of the power generation produced by the GVvFES 100. The outlet diffuser 130 can also be lowered, as described in more detail below, to maintain a sufficient separation between the low point of the basin extension 126 and the upper surface of the outlet diffuser 130. The low water volume can drain through the outlet portion and be disbursed into the tail race flow via the lowered outlet diffuser 130. It will be apparent to those of ordinary skill in the art in view of the disclosure herein that the number of turbine basin inserts or extensions may vary from one to as many as the operator would want based on the flow data. If there are radical or significant changes in flow rates, perhaps the operator may choose to use four, five, or more extensions, but perhaps of smaller height to keep the efficiencies at maximum.

The GVvFES 100 of an example embodiment can include an adjustable height outlet flow diffuser 130. The outlet diffuser 130 can be raised or lowered to maintain a sufficient separation between the low point of the basin 120 or basin extensions 126/127 and the upper surface of the outlet diffuser 130. The outlet diffuser 130 can be raised and lowered by use of the diffuser mounting rack 131 with the adjustable diffuser height feature provided by an example embodiment. As shown in FIGS. 3 through 7, the outlet diffuser 130 can be mounted on a horizontal support of the diffuser mounting rack 131. The horizontal support can be raised and lowered along vertical posts 132 of the diffuser mounting rack 131 and manually held in place with screws or pins. In another embodiment shown in FIG. 7, the adjustable height outlet flow diffuser 130 can be mounted on diffuser mounting rack 131 and automatically raised or lowered using diffuser assembly drive motor 110 coupled with the horizontal support of the diffuser mounting rack 131 via connective cabling. The diffuser assembly drive motor 110 can be configured and controlled by control panel 103 to automatically raise or lower the diffuser 130 with the connective cabling along the vertical posts 132 of the diffuser mounting rack 131. Additionally, the example embodiment can include a diffuser maximum height sensor 111 and a diffuser minimum height sensor 112 to signal the control panel 103 and the diffuser assembly drive motor 110 to stop at a highest or lowest position, respectively.

The adjustable height outlet flow diffuser 130 functions to maintain the maximum static head for any seasonal flow variations. The diffuser 130 can be raised or lowered (manually or automatically) in very small increments to maintain any given static head requirements at any given seasonal flow range. The adjustable height outlet flow diffuser 130 also functions in this manner when one or more basin extensions 126/127 are inserted into the basin 120. While the basin extensions 126/127 help to regulate needed macro adjustments in the outlet portion flow rates, the diffuser 130 serves to fine tune or micro adjust the outlet portion flow to exactly maintain maximum head within the basin 120 during any seasonal flow changes or mechanically changed flow rates from reservoirs. The diffuser 130 can be adjusted (manually or automatically) up or down to regulate the outlet portion flow rate thereby protecting the basin 120 head level. Based on the needs and financial considerations at any given site, the flow diffuser lift, support and operating systems can be designed and operated either as mechanical or hydraulic systems.

Referring again to FIGS. 4 through 6, the GVvFES 100 of an example embodiment includes an adjustable turbine blade 122 height within the basin 120 structure. In conjunction with the adjustable pitch and angle turbine blades 122 on the turbine blade hub 124, as described below, to maintain high power output from the vortex turbine, the turbine blade hub 124 height placement within the basin 120 structure and within the water vortex high energy zones is critical to high output efficiencies. Referring to FIGS. 4 through 6, the height of the turbine blade hub 124 relative to the top of the basin 120 can be automatically or manually varied and adjusted using a screw drive shaft 106 and a drive motor 107 to turn the screw drive shaft 106 to raise and lower the combined generator 102 and turbine blade hub 124 assembly connected via the turbine blade axle 123. This height variability of the turbine blade hub 124 assembly enables the GVvFES 100 of an example embodiment to position the turbine blade hub 124 assembly in the most optimal location within the water vortex to maximize electrical energy generation. This optimal location within the water vortex can be maintained even when the head or water volume changes causing changes to the water vortex. Example embodiments shown in FIGS. 4 through 6 demonstrate this adjustable turbine height feature that facilitates exact placement of the turbine blade hub 124 within the highest energy zone in any given vortex throughout the annual flow cycle.

Referring still to FIGS. 4 through 6, FIG. 4 illustrates an example embodiment of the GVvFES basin 120 in a cross section view at high flow with the turbine blade hub 124 in a high position. Note that the drive motor 107 has been energized to turn the screw drive shaft 106 to raise the combined generator 102 and turbine blade hub 124 assembly connected via the turbine blade axle 123. Because of the high water flow and relatively higher water vortex 200, the turbine blade hub 124 assembly has been raised to position the turbine blade hub 124 assembly in the most optimal location within the water vortex 200 to maximize electrical energy generation by the generator 102.

FIG. 5 illustrates an example embodiment of the GVvFES basin 120 in a cross section view at medium flow with the turbine blade hub 124 in a lower position. Note that the drive motor 107 has been energized to turn the screw drive shaft 106 to lower the combined generator 102 and turbine blade hub 124 assembly connected via the turbine blade axle 123. Because of the medium level water flow and relatively lower water vortex 200, the turbine blade hub 124 assembly has been lowered to position the turbine blade hub 124 assembly in the most optimal location within the water vortex 200 to maximize electrical energy generation by the generator 102.

FIG. 6 illustrates an example embodiment of the GVvFES basin 120 in a cross section view at low flow with the turbine blade hub 124 in a lowest position. Note that the drive motor 107 has been energized to turn the screw drive shaft 106 to further lower the combined generator 102 and turbine blade hub 124 assembly connected via the turbine blade axle 123. Because of the low level water flow and relatively lower water vortex 200, the turbine blade hub 124 assembly has been further lowered to position the turbine blade hub 124 assembly in the most optimal location within the water vortex 200 to maximize electrical energy generation by generator 102. In each case, the control panel 103 can generate command signals to cause the drive motor 107 to automatically turn the screw drive shaft 106 in a direction (clockwise or counter-clockwise) appropriate for adjusting the level of the turbine blade hub 124 to correspond with the currently existing water flow conditions within the basin 120.

Figure 7:
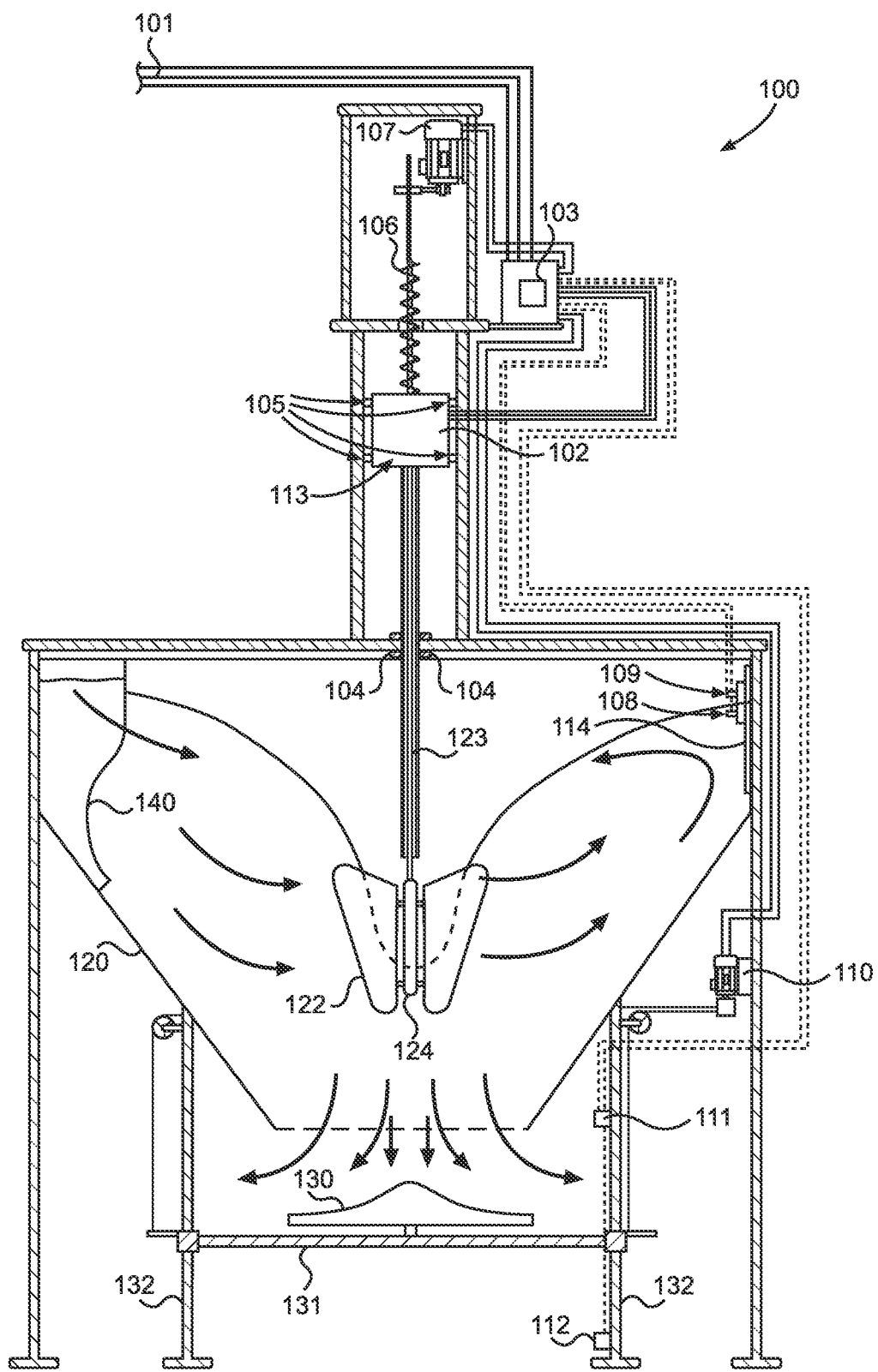
FIG. 7 illustrates an example embodiment of the GVvFES basin in a cross section view showing the controls, sensors, linkage, and drivers of the system in the example embodiment.

FIG. 7 illustrates an example embodiment of the GVvFES basin 120 in a cross section view showing the computerized controls, sensors, switch gear controls, linkage, and drivers of the system in the example embodiment. The GVvFES 100 in an example embodiment includes full automation in operations and control features. Smaller design plans can be operated by an all manual control system or a hybrid system in which some of the operations are automatic while some remain controlled manually. FIG. 7 illustrates the major electrical components and connectivity, sensors and connectivity, and adjustment servo motors, linkage, and connectivity with their respective main functions as described below.

Referring still to FIG. 7, the GVvFES 100 of an example embodiment includes main electrical lines 101 connecting the electrical power grid to/from the facility at which the GVvFES 100 is located. These main electrical lines 101 can be directly connected to the electrical control panel 103. The generator 102 can also be connected to the control panel 103 via three phase alternating current (A/C) electrical lines as shown in FIG. 7. The generator 102 can generate electrical power output for the electrical power grid. Some of this power can be used by the facility at which the GVvFES 100 is located to operate the control panel 103, servo motors, and the like. The electrical control panel 103 of an example embodiment can be a computerized and digital electrical, sensor, and switch gear control panel. The electrical control panel 103 can include a data processor, data storage devices, a user input device, and a wireless communications device. The data processor can be configured to execute resident or downloaded software, firmware, or other control logic. Data and/or executable instructions can be received or sent via the wireless communications device. The control panel 103 can be connected with and receive data input from all sensors of the GVvFES 100 to actively monitor and control all operational functions. Sensor input indicating needed adjustments can be processed by the data processor, which can generate corresponding control signals and route the control signals to the appropriate servo motors to activate and execute needed adjustments. The automated monitoring and control of the GVvFES 100 is an important feature of the system to ensure the electrical generation facility is operating at nominal efficiencies at all times. The control panel 103 can also receive active electrical feedback from the electrical power grid. In the event the electrical power grid goes down or de-energizes for any reason, the control panel 103 can shut down operations of the GVvFES 100 until such time as the electrical power grid is back on line and stable for at least a pre-determined time (e.g., 45 minutes) before executing a restart command. The flow of electrical power to/from the electrical power grid is bidirectional to ensure that electricity from the electrical power grid is available to the facility at which the GVvFES 100 is located in the event the generator 102 is off line for any reason.

Referring still to FIG. 7, the GVvFES 100 of an example embodiment includes main shaft guide bearings 104 to support and position the turbine blade axle 123 connecting the turbine blade hub 124 to the generator 102. The main shaft guide bearings 104 position and stabilize the turbine axle 123 during operations and when the generator 102 and turbine blade hub 124 are raised or lowered. Generator slide bearings 105 provide support and proper positioning of the generator 102 as the generator 102 is raised or lowered to a proper operating height. As described above, drive motor 107 is provided to turn the screw drive shaft 106 to raise or lower the combined generator 102 and turbine blade hub 124 assembly connected via the turbine blade axle 123. The drive motor 107 can be automatically controlled by the command signals sent by the control panel 103. As described above, the raising or lowering of the combined generator 102 and turbine blade hub 124 assembly ensures precise turbine blade hub 124 positioning to extract the maximum vortex energy.

Referring still to FIG. 7, the GVvFES 100 of an example embodiment includes high basin water level sensor 109 configured to detect when the water level within the basin 120 is too high, which indicates there is excessive pressure being produced by the position of the outlet diffuser 130. In this case, the position of the outlet diffuser 130 can be automatically adjusted (typically lowered) to prevent a reduction in electrical power output because of a less than desired outlet portion flow rate and a higher than desired water level within the basin 120. As described above, command signals from the control panel 103 can be used to control the diffuser assembly drive motor 110 to lower the outlet diffuser 130. The GVvFES 100 of an example embodiment also provides a low basin water level sensor 108 configured to detect when the water level within the basin 120 is too low. This condition indicates there is not enough pressure being produced by the position of the outlet diffuser 130. In this case, the position of the outlet diffuser 130 can be automatically adjusted (typically raised) to prevent a reduction in electrical power output because of a weakened vortex profile caused by a higher than desired outlet portion flow rate and a lower than desired water level within the basin 120. Additionally, an example embodiment can include a high/low sensor mount slide bar 114. The low basin water level sensor 108 and the high basin water level sensor 109 can be mounted on the high/low sensor mount slide bar 114. The high/low sensor mount slide bar 114 can be vertically adjusted to vary the position of the low basin water level sensor 108 and the high basin water level sensor 109 within the basin 120. The adjustable high/low sensor mount slide bar 114 allows an operator to precisely position the low basin water level sensor 108 and the high basin water level sensor 109 for best results at a particular facility for any given season water flow rate.

As described above, command signals from the control panel 103 can be used to control the diffuser assembly drive motor 110 to raise the outlet diffuser 130. As described above, the diffuser maximum height sensor 111 detects when the outlet diffuser 130 assembly is positioned at a maximum height level and no additional pressure can be placed on the outlet portion flow rate. When the diffuser maximum height sensor 111 detects that the outlet diffuser 130 assembly is positioned at a maximum height level, a sensor data signal can be sent to the control panel 103, which can automatically send a notice (e.g., a text and/or email message) to an operator of the facility in which the GVvFES 100 is located. The wireless communications device of the control panel 103 can be used for this purpose. This notice can indicate that an additional basin extension 126/127 may need to be inserted or installed at a lower portion of the turbine basin based on the detected maximum height level position of the outlet diffuser 130 assembly and a corresponding reduction of water volume flowing into or maintained within the basin 120. The installation of an additional basin extension 126/127 can realign the overall flow range within the basin 120 to ensure the strongest vortex for maximum electrical power output. Flow reductions from natural stream flows or flows from reservoir type water sources are typical when there is seasonal reduction in precipitation or reduced release flow rates from reservoir type water sources. The diffuser minimum height sensor 112 detects when the outlet diffuser 130 assembly is positioned at its lowest possible height level. When this sensor detects that the outlet diffuser 130 assembly is positioned at a minimum height level, a sensor data signal can be sent to the control panel 103, which can automatically send a notice (e.g., a text and/or email message) to an operator of the facility in which the GVvFES 100 is located. The wireless communications device of the control panel 103 can be used for this purpose. This notice can indicate that a basin extension 126/127 may need to be removed based on the detected minimum height level position of the outlet diffuser 130 assembly and a corresponding increase of water volume flowing into or maintained within the basin 120. The removal of a basin extension 126/127 can realign the overall flow range within the basin 120 to ensure the strongest vortex for maximum electrical power output. The detection that the outlet diffuser 130 assembly is positioned at a minimum height level can indicate that overall flow volumes from various water sources have improved, possibly because of increased precipitation or increases in artificial releases from a reservoir type water source.

Referring still to FIG. 7, the GVvFES 100 of an example embodiment includes turbine blade pitch and angle linkage controls and servo motors 113 located within the main generator 102 housing. The generator 102 housing can be used to contain the top of the turbine blade axle 123, which connects to the turbine blade hub 124. The small servo motors that controls the linkage to adjust the turbine blade 122 angle and pitch can also be located within the main generator 102 housing well above any active water levels. From these servo motors, the control linkage runs down within the turbine blade axle 123 to the turbine blade hub 124. As described in more detail below, at the turbine blade hub 124, adjustable elbow link push arms connect each turbine blade 122 to make configurable adjustments to the turbine blade 122 angle and pitch to provide maximum operating efficiencies. Within the turbine blade hub 124, the top and bottom connecting linkage to each blade can have a 90 degree connector knuckle joint that allows the linkage arm to change its horizontal blade angle thereby creating a reduced angle relative to the turbine blade hub 124. Reducing the turbine blade 122 angle during specific flow rates spreads the high energy zone over a larger portion of each turbine blade 122 creating overall higher power output efficiencies. The linkage on the top of each turbine blade 122 can also have an additional joint, which allows the top of the turbine blade 122 to rotate back from perpendicular thereby increasing the turbine blade 122 pitch angle. This increase in turbine blade 122 pitch angle creates enhanced efficiencies of the vortex flow profile, which can change throughout the various seasonal flow rates.

Figure 8:
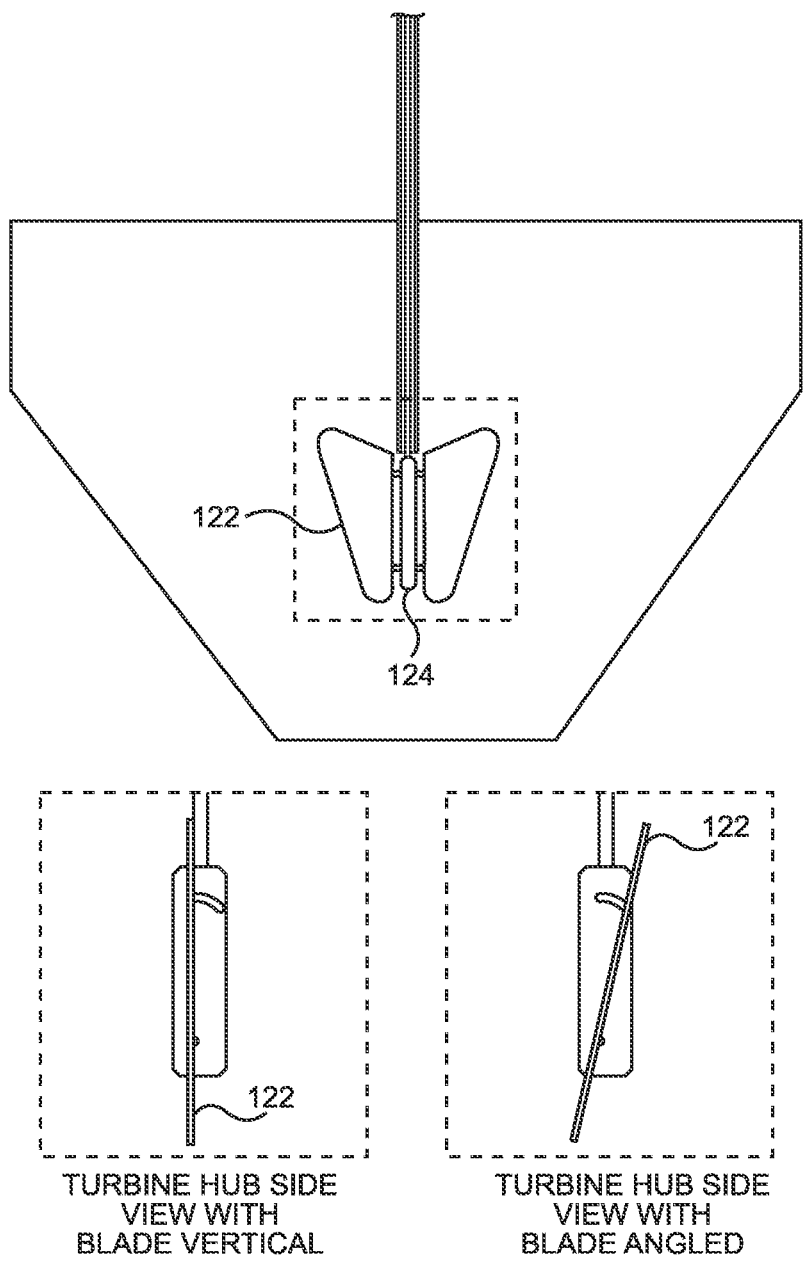
FIG. 8 illustrates an example embodiment of the GVvFES in a side view showing the variable angle of the turbine blade hub and turbine blades.

FIG. 8 illustrates an example embodiment of the GVvFES 100 in a side view showing the variable angle of the turbine blade hub 124 and turbine blades 122. Over the range of seasonal flow rates, there can be slight changes in the vortex shape, characteristics, and location. As such, to maintain high efficiency electrical power output, the GVvFES 100 of an example embodiment can automatically configure the angle and pitch of the turbine blades 122 to maximize the energy extraction methodology. CFD modeling demonstrates a benefit in adjusting both the turbine blade 122 angle and pitch to maintain high output given the variations in the vortex shape and high energy zones. The adjustable turbine blade 122 feature provided by the GVvFES 100 of an example embodiment allows this energy extraction system to adjust to the shifting high energy zones within the vortex at varying flow rate levels to maximize power output. As described above, control linkage runs from servo motors in the generator 102 housing down within the turbine blade axle 123 to the turbine blade hub 124. At the turbine blade hub 124, adjustable elbow link push arms connect each turbine blade 122 to make configurable adjustments to the turbine blade 122 angle to provide maximum operating efficiencies. Within the turbine blade hub 124, the top and bottom connecting linkage to each blade can have a 90 degree connector knuckle joint that allows the linkage arm to change its horizontal blade angle thereby creating a reduced angle relative to the turbine blade hub 124. Reducing the turbine blade 122 angle during specific flow rates spreads the high energy zone over a larger portion of each turbine blade 122 creating overall higher power output efficiencies. The servo motors in the generator 102 housing can be connected to the control panel 103 enabling the data processor in the control panel 103 to automatically control the servo motors to apply a desired angular deflection of each turbine blade 122 to create higher electrical power output efficiencies.

Figure 9:
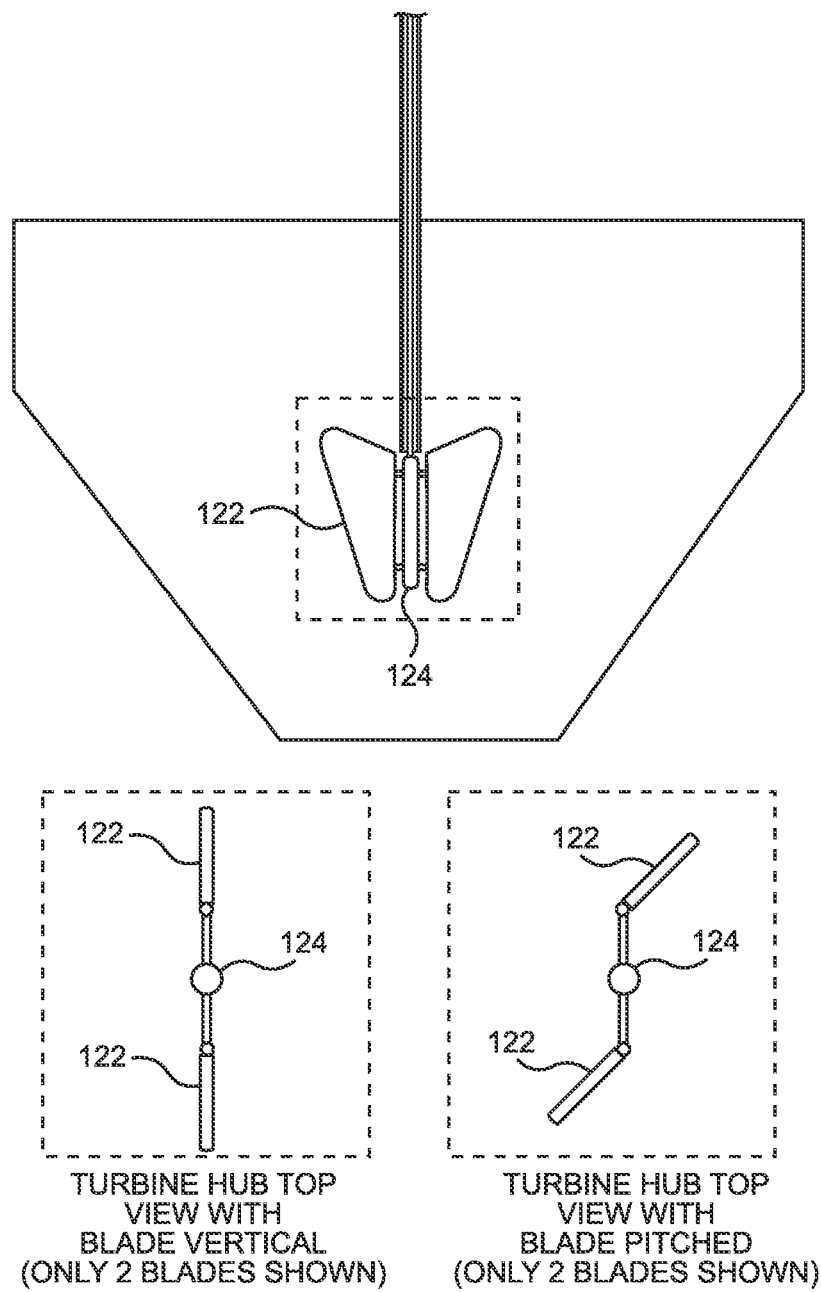
FIG. 9 illustrates an example embodiment of the GVvFES in a top view showing the variable pitch of the turbine blade hub and turbine blades.

FIG. 9 illustrates an example embodiment of the GVvFES 100 in a top view showing the variable pitch of the turbine blade hub 124 and turbine blades 122. As described above, control linkage runs from servo motors in the generator 102 housing down within the turbine blade axle 123 to the turbine blade hub 124. At the turbine blade hub 124, adjustable linkage on the top of each turbine blade 122 can be configured with a pitch adjustment joint, which allows the top of the turbine blade 122 to rotate back from perpendicular thereby increasing the turbine blade 122 pitch angle. This increase in turbine blade 122 pitch angle creates enhanced efficiencies of the vortex flow profile, which can change throughout the various seasonal flow rates. The servo motors in the generator 102 housing can be connected to the control panel 103 enabling the data processor in the control panel 103 to automatically control the servo motors to apply a desired level of pitch to each turbine blade 122 to create higher electrical power output efficiencies.

The example embodiments of the GVvFES 100 as described herein include a variety of features and structures that can combine to create significantly and consistently higher electrical power output efficiencies for vortex electrical power generation facilities. With each of these novel features working in concert, the GVvFES 100 turbine system is now capable of enhanced output levels meeting or exceeding operational requirements for competitive commercial operations. The GVvFES 100 turbine design as disclosed in the various example embodiments also provides significant reductions in construction capital requirements compared to current turbine/generator systems now in use for high flow, low head commercial operations. In addition to the operational output enhancements and construction savings, the GVvFES 100 turbine design also provides added environmental benefits. This includes improved oxygenation of the water from the natural aeration process that occurs within a mature dynamic vortex. The disclosed GVvFES 100 turbine design also provides a safe passageway for fish through the turbine while in full operations due in part to the very slow rotation speed of the turbine blade hub 124 and the substantial amount of space and water flow between the turbine blades and the outer basin wall. The disclosed GVvFES 100 turbine design also provides aeration of the water, which helps to improve water conditions for marine life. Additionally, the reduced speeds of the turbine and the lack of cavitation helps to ensure that fish can pass through the turbine without danger, something which is much more difficult, if not impossible to achieve at conventional hydroelectric plants. In these cases, additional structures and passage ways are required for safe fish migration.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used only for descriptive purposes and not to be construed as limiting. The elements, materials, geometries, dimensions, and sequence of operations may all be varied for particular applications. Parts of some embodiments may be included in, or substituted for, those of other embodiments. While the foregoing examples of dimensions and ranges are considered typical, the various embodiments are not limited to such dimensions or ranges.

The Abstract is provided to allow the reader to quickly ascertain the nature and gist of the technical disclosure. The Abstract is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

As described herein, a Gravitational Vortex Variable Flow Energy System (GVvFES) is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A gravitational vortex variable water flow energy generating system comprising:
    a turbine basin having an inlet portion and an outlet portion, the turbine basin having a hybrid conical shape;
    a generator installed adjacent to the turbine basin;
    a turbine blade hub having turbine blades attached thereto, the turbine blade hub being coupled to the generator with a turbine blade axle, the generator being coupled to a screw drive shaft, the screw drive shaft coupled to a screw drive motor, the turbine blade hub having a variable height relative to a top of the turbine basin through operation of the screw drive shaft and the screw drive motor; and a diffuser installed beneath the outlet portion of the turbine basin, the diffuser supported by a moveable diffuser mounting rack, the moveable diffuser mounting rack being supported by posts and coupled to a diffuser assembly drive motor, the diffuser having a variable height relative to a bottom of the turbine basin through operation of the moveable diffuser mounting rack and the diffuser assembly drive motor.

2. The gravitational vortex variable water flow energy generating system of claim 1 including a flow inlet wedge inserted or installed in the inlet portion to control a water entry angle and a water velocity when water enters the turbine basin.

3. The gravitational vortex variable water flow energy generating system of claim 1 including a control panel coupled to the screw drive motor to control the height of the turbine blade hub within the turbine basin.

4. The gravitational vortex variable water flow energy generating system of claim 1 wherein the screw drive shaft can be rotated in a clockwise or counter-clockwise direction to adjust the height of the turbine blade hub within the turbine basin.

5. The gravitational vortex variable water flow energy generating system of claim 1 including a control panel coupled to the diffuser assembly drive motor to control the height of the diffuser relative to the bottom of the turbine basin.

6. The gravitational vortex variable water flow energy generating system of claim 1 wherein the moveable diffuser mounting rack is coupled to connective cabling to adjust the height of the diffuser relative to the bottom of the turbine basin.

7. The gravitational vortex variable water flow energy generating system of claim 1 wherein the height of the turbine blade hub relative to the top of the turbine basin can be automatically or manually varied.

8. The gravitational vortex variable water flow energy generating system of claim 1 wherein the height of the diffuser relative to the bottom of the turbine basin can be automatically or manually varied.

9. The gravitational vortex variable water flow energy generating system of claim 1 wherein the height of the turbine blade hub relative to the top of the turbine basin can be automatically varied based on an output from a sensor.

10. The gravitational vortex variable water flow energy generating system of claim 1 wherein the height of the diffuser relative to the bottom of the turbine basin can be automatically varied based on an output from a sensor.

11. The gravitational vortex variable water flow energy generating system of claim 1 including a sensor installed in the turbine basin to detect a water level within the turbine basin.

12. The gravitational vortex variable water flow energy generating system of claim 11 wherein the sensor is installed on a sensor mount slide bar, which can be vertically adjusted to vary a position of the sensor within the turbine basin.

13. The gravitational vortex variable water flow energy generating system of claim 1 wherein the turbine blade hub is coupled to linkage controls and servo motors to vary an angle of the turbine blades.

14. The gravitational vortex variable water flow energy generating system of claim 1 wherein the turbine blade hub is coupled to linkage controls and servo motors to vary a pitch of the turbine blades.

15. The gravitational vortex variable water flow energy generating system of claim 13 wherein the linkage controls and servo motors are coupled to a control panel for controlling the angle of the turbine blades.

16. The gravitational vortex variable water flow energy generating system of claim 14 wherein the linkage controls and servo motors are coupled to a control panel for controlling the pitch of the turbine blades.

17. A gravitational vortex variable water flow energy generating system comprising:

a turbine basin having an inlet portion and an outlet portion, the turbine basin having a hybrid conical shape;

a generator installed adjacent to the turbine basin;

a turbine blade hub having turbine blades attached thereto, the turbine blade hub being coupled to the generator with a turbine blade axle, the generator being coupled to a screw drive shaft, the screw drive shaft coupled to a screw drive motor, the turbine blade hub having a variable height relative to a top of the turbine basin through operation of the screw drive shaft and the screw drive motor;

a diffuser installed beneath the outlet portion of the turbine basin, the diffuser supported by a moveable diffuser mounting rack, the moveable diffuser mounting rack being supported by posts and coupled to a diffuser assembly drive motor, the diffuser having a variable height relative to a bottom of the turbine basin through operation of the moveable diffuser mounting rack and the diffuser assembly drive motor;

and a control panel coupled to the screw drive motor to control the height of the turbine blade hub within the turbine basin.

18. The gravitational vortex variable water flow energy generating system of claim 17 including a flow inlet wedge inserted or installed in the inlet portion to control a water entry angle and a water velocity when water enters the turbine basin.

19. The gravitational vortex variable water flow energy generating system of claim 17 wherein the height of the turbine blade hub relative to the top of the turbine basin can be automatically varied based on an output from a sensor.

20. The gravitational vortex variable water flow energy generating system of claim 17 wherein the height of the diffuser relative to the bottom of the turbine basin can be automatically varied based on an output from a sensor.

* * * * *